United States Patent
Stewart

(12) 
(10) Patent No.: US 8,733,926 B2
(45) Date of Patent: May 27, 2014

(54) ADJUSTMENT DEVICE FOR EYEGLASSES

(76) Inventor: Ethel M. Stewart, Las Vegas, NV (US)

(*) Notice: Subject to any disclaimer, the term of this patent is extended or adjusted under 35 U.S.C. 154(b) by 89 days.

(21) Appl. No.: 13/451,313

(22) Filed: Apr. 19, 2012

(65) Prior Publication Data

US 2013/0278882 A1    Oct. 24, 2013

(51) Int. Cl.
*G02C 5/14*    (2006.01)

(52) U.S. Cl.
USPC ........................................... 351/123; 351/122

(58) Field of Classification Search
CPC ........ G02C 11/02; G02C 11/06; G02C 3/003; G02C 5/143; G02C 9/04; G02C 11/12; G02C 5/008; G02C 5/16

USPC .................. 351/122, 123, 111, 158, 121, 156
See application file for complete search history.

(56) References Cited

U.S. PATENT DOCUMENTS 3,993,403 A * 11/1976 Brown ........................... 351/178
5,137,342 A * 8/1992 Jannard et al. ................. 351/123

* cited by examiner

*Primary Examiner* — Hung Dang
(74) *Attorney, Agent, or Firm* — Ariel S. Bentolila; Bay Area IP Group, LLC

(57) ABSTRACT

An adjustment device for eyeglasses includes a column. The column includes a first end. The first end includes an aperture. The aperture is operable to be removably joined at least partially to an earpiece on the eyeglasses. A channel is disposed at least partially within the column. The aperture is further configured to allow access to the channel.

11 Claims, 2 Drawing Sheets

ADJUSTMENT DEVICE FOR EYEGLASSES

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to eyewear. More particularly, one or more embodiments of the invention relate to adjustment devices for eyeglasses.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that a significant portion of the population wears eyeglasses. However, the improved vision typically provided by those glasses may be reduced if the glasses do not stay in the correct position on the wearer. This may be a common scenario for eyeglass wearers, as glasses can sometimes easily slip for various different reasons such as, but not limited to, from perspiration, from motion of the wearer, from gravity.

By way of educational background, an aspect of the prior art generally useful to be aware of is that typically retainer cords may be used to help hold glasses in place. Eyeglass retainer cords are often tightly-binding ropes or straps that secure glasses by holding the glasses against the face of a wearer. Retainer cords can often be viewed as unattractive or foolish looking. Furthermore, one may expect that the tightness of the cord may result in impressions in the hair style or skin of the wearer, lifting the glasses too highly upon the face, causing discomfort from pulling hair, or pressing the eyeglass frames too tightly upon the bridge of the nose, or another location. In addition some retainer cords may be used solely to hold glasses or sunglasses around the neck of the wearer with little or no aid in holding the glasses or sunglasses in place on the face of the user.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a side perspective view. FIG. 1B, is a transparent top perspective view, and FIG. 1C is a diagrammatic end view; FIG. 2A is a side perspective view of the adjustment device being placed on the eyeglasses. FIG. 2B is a side perspective view of the adjustment device in place on the eyeglasses, and FIG. 2C is a side perspective view of the eyeglasses with the adjustment device being worn by a wearer.

Figure 1A:
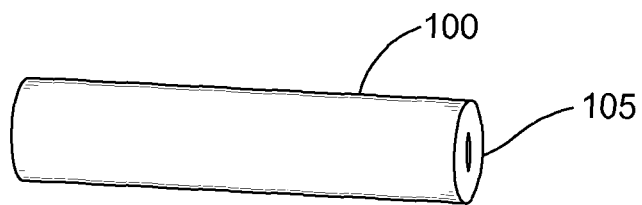
FIGS. 1A through 1C illustrate an exemplary adjustment device for eyeglasses, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention provides a device for adjusting eyeglasses that enables a wearer to comfortably maintain the eyeglasses in a proper position despite activity of and motion by the wearer, and despite environmental factors in the area of use such as, but not limited to, heat, rain, humidity, wind, and combinations thereof. In some embodiments the adjustment devices may be foam sleeves that may be placed upon an earpiece of the eyeglasses to create a comfortable friction that may generally prevent slippage of the eyeglasses. Factors that may cause slippage include, without limitation, motion, humidity, perspiration, and combinations thereof.

Figure 1B:
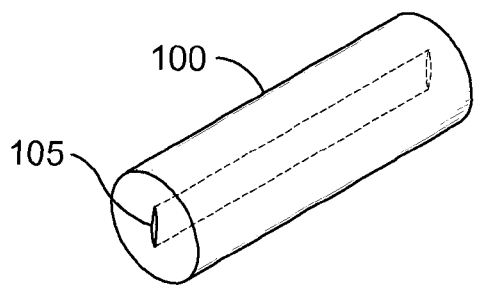
Figure 1C:
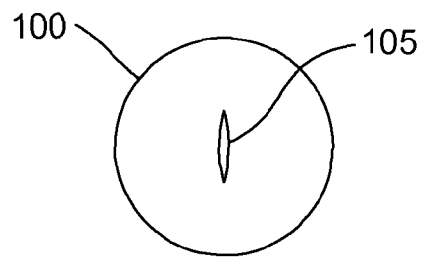

FIGS. 1A through 1C illustrate an exemplary adjustment device for eyeglasses, in accordance with an embodiment of the present invention. FIG. 1A is a side perspective view. FIG. 1B, is a transparent top perspective view, and FIG. 1C is a diagrammatic end view. In the present embodiment, the adjustment device may include a column 100. In some embodiments, the column may include a first end and a second end. In at least one embodiment of the present invention, the first end may include an aperture 105. In other embodiments, the second end may include an aperture 105. In at least one embodiment of the present invention, the column may be made of a material. The column may be configured to enable the adjustment device to be applied upon the earpiece of a pair of eyeglasses in some embodiments. Suitable shapes for the column include, but are not limited to, a cylinder, a rectangular prism, a triangular prism, a hexagonal prism and a square prism. Suitable materials for the column include, but are not limited to, a closed cell material, an open cell material, a polyurethane, and combinations thereof. The column 100 may include a length in some embodiments. One suitable length may measure approximately 1 inch. A suitable range for the length may be, but is not limited to, between ¼ inches and 12 inches. The column may include a diameter in some embodiments. One suitable diameter may measure approximately ⅜ inches. A suitable range for the diameter may be, but is not limited to, between 1/16 inches and 1 inch. In the present embodiment, the column 100 may be soft and pliant with a textured outer surface. A pliancy of the material may ensure that the adjustment device may be comfortable upon the ear. In at least one embodiment of the present invention, the adjustment device may be configured to grip an area including, but not limited to, an ear. A texture of the material may be configured to grip an area including, but not limited to the skin of the wearer in some embodiments. The grip may maintain the wearer's glasses in a proper position on a face of the wearer in some embodiments. In at least one embodiment of the present invention, the grip may prevent the glasses from moving and/or falling off even if the wearer is sweating and/or moving their head. In some alternate embodiments, the foam material used to construct the column may be of open cell formats. Some embodiments can be made of various applicable foam materials including but not limited to polyurethane and neoprene. Other alternate embodiments may be made of materials other than foam such as, but not limited to, cloth materials, plastic materials, rubber, silicone, absorbent materials, non-absorbent materials, hypoallergenic materials, and combinations thereof. It is contemplated that some alternate embodiments may be implemented without a textured surface.

In the present embodiment, the aperture 105 may provide access to a channel. The aperture may be narrow in some embodiments. In many embodiments the aperture may be a slit. In some embodiments, the aperture may extend through the length of column 100 near the center of a cross section of the column 100. In at least one embodiment of the present invention, the channel may be disposed in the column. The pliancy of the material of column 100 may enable the aperture 105 to expand to accommodate eyeglasses frames of various different sizes in some embodiments. In at least one embodiment of the present invention, the aperture may be configured to expand while maintaining a snug fit around an arm of the eyeglasses. In some embodiments, the adjustment device may prevent the eyeglasses from moving, slipping and/or falling. In some alternate embodiments, the adjustment device may be made in various different sizes and shapes and with various different types of apertures. For example, without limitation, in some alternate embodiments the device may have a rectangular cross section, an octagonal cross section, an irregular cross section, and combinations thereof. In some alternate embodiments the adjustment devices may be curved. In some alternate embodiments, the adjustment devices may have various different lengths and diameters to accommodate the area of the arm of eyeglasses of various different shapes and sizes. For example, without limitation, shorter adjustment devices with smaller diameters may be implemented for children's eyeglasses. Some alternate embodiments may include apertures of an open columnar format or open channels of various different shapes. Other alternate embodiments may include multiple slits. Yet other alternate embodiments may include textured, adhesive or clinging coatings within the aperture to help keep the adjustment devices on the eyeglasses.

Figure 2A:
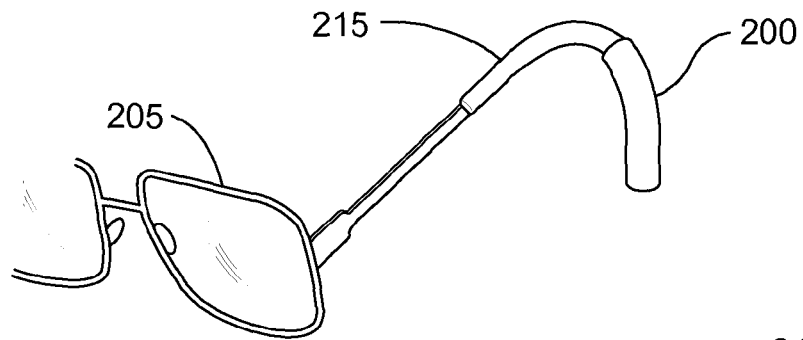
FIGS. 2A through 2C illustrate an exemplary adjustment device being used on a pair of eyeglasses, in accordance with an embodiment of the present invention.
Figure 2B:
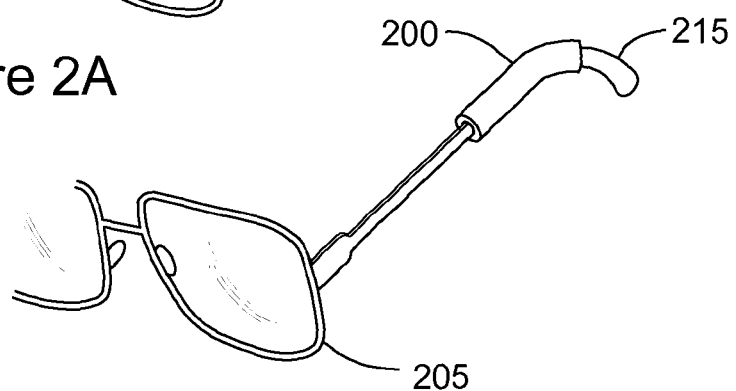
Figure 2C:
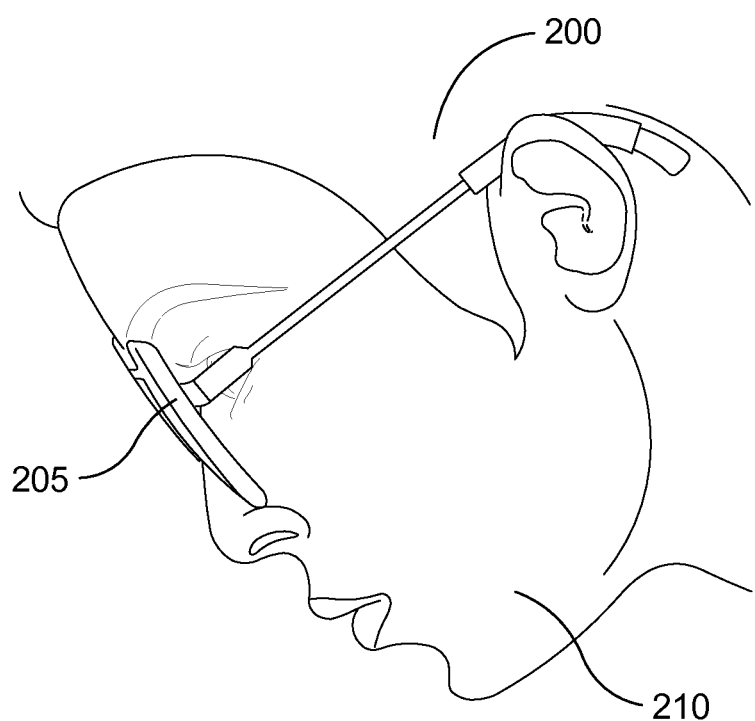

FIGS. 2A through 2C illustrate an exemplary adjustment device 200 being used on a pair of eyeglasses 205, in accordance with an embodiment of the present invention. FIG. 2A is a side perspective view of adjustment device 200 being placed on eyeglasses 205. FIG. 2B is a side perspective view of adjustment device 200 in place on eyeglasses 205, and FIG. 2C is a side perspective view of eyeglasses 205 with adjustment device 200 being worn by a wearer 210. Referring to FIGS. 2A and 2B, in the present embodiment, the wearer 210 may align an earpiece 215 of eyeglasses 205 with an open channel in the adjustment device 200 and pushes earpiece 215 into the channel, through adjustment device 200, and out the channel. In some embodiments, the wearer 210 may clean the arm of the eyeglasses 205 prior to installing the adjustment device 200. The adjustment device 200 may be positioned at any desired location along earpiece 215 to for maximum support and personalized comfort in some embodiments. Referring to FIG. 1C, the adjustment device 200 may be placed where the earpiece 215 rests between an ear and a scalp of the wearer 210. In some embodiments, the adjustment device 200 may be placed onto the earpiece 215 of the eyeglasses 205. In at least one embodiment of the present invention, once the adjustment device 200 is in the desired position, the wearer 210 may put on the eyeglasses 205.

The adjustment device 200 may make contact with the wearer 210 near a back of the ear in some embodiments. In many embodiments a surface of the adjustment device 200 may hold the eyeglasses 205 in a proper position on a face of the wearer 210. The wearer 210 may then engage in various activities with little fear of slippage of eyeglasses 205 due to factors such as, but not limited to, perspiration, head position, movement of the head or ambient forces such as, but not limited to, winds, humidity, rain, and combinations thereof. The wearer 215 may also avoid adjustment of the eyeglasses 205 in some embodiments. In at least one embodiment of the present invention, the adjustment device 200 may also be configured to prevent the eyeglasses 205 from falling from wearer 210 during use. In some embodiments, damage to the eyeglasses 205 that may be caused by slippage and falling may be prevented. The wearer 210 may remove the adjustment device 200 by pulling the adjustment device over the earpiece 215 and off of the eyeglasses 205 in some embodiments. If desired, the wearer 215 may then place a new adjustment device on eyeglasses 205 in many embodiments.

Adjustment devices according to the present embodiment may be worn on eyewear including, but not limited to, corrective eyewear, sunglasses, reading glasses, fashion glasses, and combinations thereof. In at least one embodiment of the present invention, the adjustment device may join to the earpiece of the eyeglasses. In some embodiments, extreme accuracy and dexterity is generally not needed to apply the adjustment device. In some embodiments, a tip of the earpiece may enter the aperture. In at least one embodiment of the present invention, the aperture may expand to allow insertion of the earpiece. Easy installation may be helpful for many wearers of glasses including, but not limited to, older wearers of glasses who may have issues including, but not limited to, dexterity issues, hand shaking issues, and combinations thereof. Adjustment devices according to many embodiments are often barely visible. Many embodiments do not wrap around a head of the wearer. In some embodiments, an indentation is not made in an area including, but not limited to the hair or skin of the wearer. In some embodiments, the column may be at least partially concealed behind the hair of the wearer.

Many embodiments may be used by a variety of wearers including, without limitation, cooks, food servers, mechanics, machine operators, construction workers, plumbers, landscapers and others in occupational fields that require manual and/or outdoor work and/or who work in non-climate controlled environments. Many embodiments may also be used by wearers who wish to maintain correct position of eyeglasses during activities such as, but not limited to, gardening, sporting activities, other outdoor recreational tasks, sewing, stitching, knitting, typing, recreational tasks, occupational tasks, and combinations thereof in which the head must be kept forward, or in another location. The frictional yet comfortable contact of the adjustment devices according to some embodiments may help the wearer maintain eyeglass position and corrected vision despite outside forces, such as, but not limited to, wind, thus addressing the needs of boaters, cyclists and many other potential users. Some embodiments may also help first-time eyeglass wearers adjust to the eyeglasses.

Many embodiments of the present invention may be inexpensive to purchase. Some embodiments may be provided in packages of multiple units. For example, without limitation, three (3) sets of adjustment devices may be included, without limitation, in a single package, totaling six (6) individual units of the device per package, or five (5) sets of adjustment devices totaling ten (10) individual units may be included, without limitation, in a package. It is contemplated that adjustment devices in various alternate embodiments may be packaged in various quantities for retail sale.

Those skilled in the art will readily recognize, in light of and in accordance with the teachings of the present invention, that some alternate embodiments of the present invention may be implemented with various different properties and features. For example, without limitation, some alternate embodiments may be produced in various different colors and patterns, and may bear various designs, images and/or logos, which may or may not be of registered trademark and/or copyright status. In at least one embodiment of the present invention, the column may be, but is not limited to, clear, or transparent. Other alternate embodiments may be made in particular colors with purpose of matching, coordinating or blending with specific models of eyeglass frames. Some alternate embodiments may be made in variations that include, without limitation, perfumes and/or deodorizing agents, which may extend comfortable wear despite collection of and/or proximity to perspiration. In some alternate embodiments, adjustment devices may be made in variations as, or in packages that include, a nose bridge structure for application upon the relevant portion of eyeglasses.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of adjustment devices for eyeglasses according to the present invention will be apparent to those skilled in the art. The invention has been described above by way of illustration, and the specific embodiments disclosed are not intended to limit the invention to the particular forms disclosed. For example, the particular implementation of the adjustment device may vary depending upon the particular type of aperture used. The apertures described in the foregoing were directed to channel implementations that are positioned though the length of the devices; however, similar techniques are to provide adjustment devices with various different types of apertures such as, but not limited to, a slit positioned from the outer surface of a device to the center of the device which generally enables the device to be slipped over an earpiece horizontally. Implementations of the present invention with various different types of apertures are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An adjustment device for eyeglasses, the eyeglasses including an earpiece, the adjustment device consisting of:
   a column, said column comprising:
      a first end comprising an aperture, said aperture being operable to be removably joined at least partially to the earpiece;
      a second end comprising an aperture, said aperture being operable to be removably joined at least partially to the earpiece;
      a polyurethane foam;
         said polyurethane foam comprises a transparent material;
         said polyurethane foam further comprises a closed-cell polyurethane foam;
      in which said column further comprises a transparent material;
   a channel, said channel being disposed at least partially within said column;
   in which said aperture being further configured to allow access to said channel;
   in which said aperture is further configured to be operable to expand, and said column is further configured to be operable to expand.

2. The adjustment device of claim 1, in which said column further comprises a cylinder.

3. The adjustment device of claim 1, in which said column further comprises a textured outer surface.

4. The adjustment device of claim 3, said textured outer surface being configured to minimize motion of the eyeglasses on a head of a wearer.

5. The adjustment device of claim 1, said column being configured to be concealed at least partially behind hair of a wearer.

6. An adjustment device for eyeglasses, the eyeglasses including an earpiece, the adjustment device consisting of:
   a polyurethane foam column, said column comprising:
      a first end comprising an aperture, said aperture being operable to be removably joined at least partially to the earpiece;
      said polyurethane foam column further comprises an open-cell polyurethane foam; and
   a channel, said channel being disposed at least partially within said column;
   in which said aperture being further configured to allow access to said channel;
   in which said column further comprises a second end comprising an aperture, said aperture being operable to be removably joined at least partially to the earpiece;
   in which said column further comprises a transparent material.

7. The adjustment device of claim 6, in which said column further comprises a cylinder.

8. The adjustment device of claim 6, in which said aperture is further configured to be operable to expand, and said column is further configured to be operable to expand.

9. The adjustment device of claim 6, in which said column further comprises a textured outer surface.

10. The adjustment device of claim 9, said textured outer surface being configured to minimize motion of the eyeglasses on a head of a wearer.

11. The adjustment device of claim 6, said column being configured to be concealed at least partially behind hair of a wearer.

* * * * *